United States Patent [19]

Hovde

[11] Patent Number: 4,612,745
[45] Date of Patent: Sep. 23, 1986

[54] BOARD FLOORS

[76] Inventor: Oskar Hovde, Kyvannsveien 34, N-7000 Trondheim, Norway

[21] Appl. No.: 773,096

[22] Filed: Sep. 4, 1985

[30] Foreign Application Priority Data

Aug. 9, 1982 [NO] Norway .................. 822,703

Related U.S. Application Data

[63] Continuation of Ser. No. 498,970, May 27, 1983, abandoned.

[51] Int. Cl.⁴ .................. E04F 15/14; E04B 5/48
[52] U.S. Cl. .................. 52/220; 52/586
[58] Field of Search .......... 52/220, 585, 586, 221, 52/582

[56] References Cited

U.S. PATENT DOCUMENTS

| 2,271,798 | 2/1942 | Lewin | 52/221 |
| 3,681,883 | 8/1972 | Ehrlich | 52/220 |
| 3,744,197 | 7/1973 | Wetzel | 52/220 |
| 4,028,858 | 6/1977 | Rehbein | 52/585 X |
| 4,169,688 | 10/1979 | Toshio | 52/586 X |
| 4,170,859 | 10/1979 | Counihan | 52/586 X |
| 4,326,366 | 4/1982 | Werner | 52/220 |

FOREIGN PATENT DOCUMENTS

| 2006263 | 8/1971 | Fed. Rep. of Germany | 52/220 |
| 2106473 | 9/1972 | Fed. Rep. of Germany | 52/220 |
| 1343406 | 10/1963 | France | 52/220 |
| 2316400 | 1/1977 | France | 52/220 |
| 446680 | 11/1967 | Switzerland | 52/220 |
| 888842 | 2/1962 | United Kingdom | 52/220 |
| 1236484 | 6/1971 | United Kingdom | 52/220 |

Primary Examiner—J. Karl Bell

[57] ABSTRACT

Board floor having a main floor portion made up of boards each bounded by a peripheral groove and joint strips which are substantially narrower than the boards. The joint strips each have tongues extending outwardly from opposite sides to engage the grooves of the boards. Underneath the floor are a series of support beams to which the joint strips are anchored. A floor board adapted for fitting between a wall and the main floor portion of the board floor has a longitudinal undercut extending over a substantial portion of its breadth.

8 Claims, 2 Drawing Figures

BOARD FLOORS

This application is a continuation of application Ser. No. 498,970, filed May 27, 1983, now abandoned.

BACKGROUND OF THE INVENTION

This invention relates to board floors.

Conventional board floors are made up of identical boards or planks having grooves and tongues (mortises and tenons). Fastening is effected by concealed nailing which makes refastening and the removal of "creaks" impossible. Such floors are, in addition, subject to the formation of disfiguring cracks.

The laying of floors with known boards is time-consuming and results in many cut-off ends. Prior floorings certainly do not provide the possibility for the concealed mounting of electrical cables, water pipes and the like.

A main object of the present invention is to create board floors which are easy to lay and give rise to the least possible waste. Space should also be provided for the concealed laying of cables and thin pipes.

A particular object is to produce a board floor where possibe cracks do not appear disfiguring and where the boards can be refastened.

Lewin in U.S. Pat. No. 2,271,798 discloses board floors made up of conventional tongue and groove boards one of which has a longitudinally extending recess in its undersurface for accommodating a conduit through which electrical conductors pass.

Another object of the invention is to create a board flooring where edge-finishing along the walls can be done more readily than hitherto.

SUMMARY OF THE INVENTION

Board floors are provided which comprise a main floor portion made up of boards each bounded by a peripheral groove and joint strip means substantially narrower than said boards. The joint strip means have tongues extending outwardly from opposite sides to engage the grooves of the boards. Underlying the floor are support means to which the joint strip means are anchored.

BRIEF DESCRIPTION OF THE DRAWINGS

In order that the invention can be more clearly understood a preferred embodiment thereof will now be described, by way of example, with particular reference to the accompanying drawings in which.

DESCRIPTION OF THE PREFERRED EMBODIMENT

Figure 1:
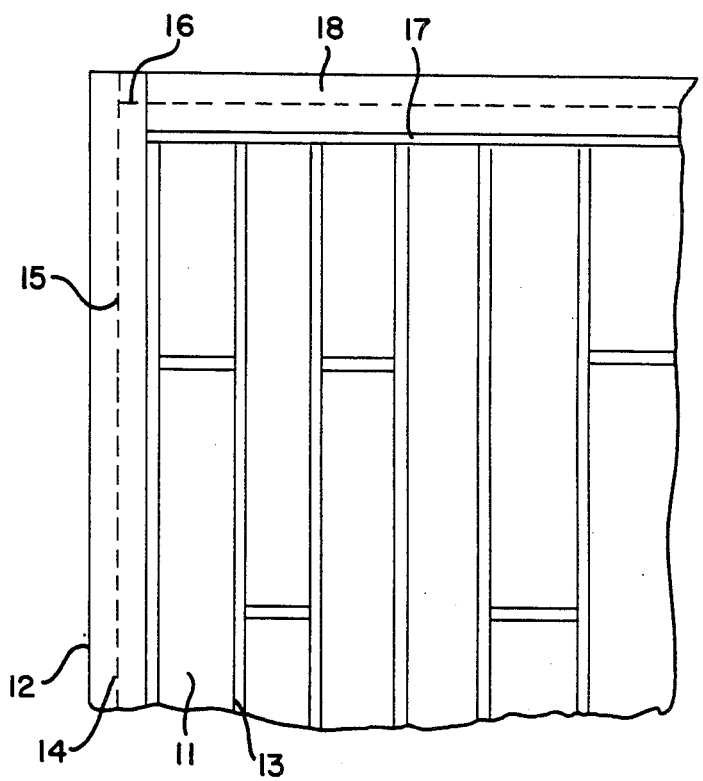
FIG. 1 is a schematic plan view of a corner of a board floor.

Referring to FIG. 1, a board floor has a main portion made up of boards 11, with grooves (mortises) on both sides, extending in parallel from a first wall 12. Between the boards 11, there are inserted joint strips 13. A board 14 passes along the whole length of wall 12 and has cut in from its outer edge a longitudinal undercut 15. If desired, board 14 can be jointed. At the one end, there is made an undercut 16 adapted to the undercut 15 in the longitudinal side. The boards 11 which follow the first and constitute the main portion of the board floor have ends terminating at a distance of the breadth of a single board from the nearest wall. All of the boards 11 are provided with grooves (mortises) at their ends so that a board 18 can be arranged across boards 11 to fit between a wall and a joint strip 17 which is adapted to engage grooves in boards 11 and 18. This simplifies laying since board 18 can readily be guided into place and secured by means of joint strip 17 and an edge strip (not shown) as will be described later with respect to FIG. 2.

This design and mode of laying gives several practical and aesthetic advantages in addition to simplifying laying. The most important lies in the formation of ducts in the undercut along the walls. These can stretch generally around the floor and can be used for the location of electric cables and water or fuel pipes (see FIG. 2).

Figure 2:
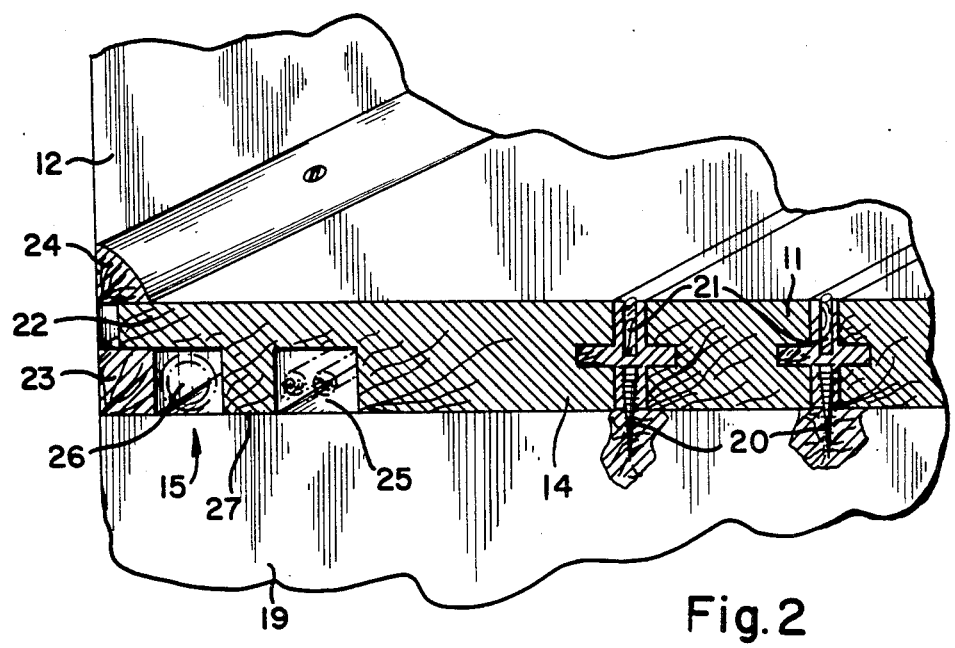
FIG. 2 is a perspective vertical section through an edge of the board floor of FIG. 1.

In FIG. 2, board 14 is shown anchored to a support beam 19 by means of a joint strip 13 which is secured to support beam 19 by means of screws. Screw holes above the screws are suitably closed by a wooden plug 21, although wood filler can be used instead.

The formation of undercut 15 results in a tongue 22 adjacent wall 12 which is supported at its outer edge by support strip 23. In addition, an edge strip 24 is screwed firmly above edge board 14 in order to retain it in position.

Undercut 15 is divided by partition strip 27 into inner and outer ducts 25, 26. These two ducts can be used separately for accommodating electric cables and water-conducting pipes. More than two ducts can also be made in order, for example, to provide space for more than two types of conduits or pipes.

Edge boards 14 and 18 and, if desired, corresponding edge boards along the remaining sides of the main board portion, can be removed without anything having to be done to the floor. This is a decisive advantage since it permits the laying of, for example, water pipes and electric cables around a floor which already has been laid. By making the boards with end grooves and varying lengths in a module system, it is unnecessary to cut the boards in order to obtain a uniform termination thereof in a longitudinal direction. The qualification is that an equal number of joints will be made with joint strips arranged crosswise along each longitudinal stretch of boards. With a module system of 10 cm. (4 inches), good utilization can be achieved of the lengths of material which form the starting material.

By fastening edge strips 24 with screws, these can be readily disposed of if the edge boards 14 and 18 are to be removed. In this way, it is a simple matter to gain access to possible cables and the like.

It will be appreciated that even for persons without any real experience of carpentry, the board floor of the above-described embodiment is easy to lay and, moreover, no waste or cut-off ends are left behind during the laying operation. A particular advantage of such a board floor is that it can be taken up and used again without any nailing damage. Assuming that the boards are symmetrically dimensioned, it can also be turned and laid with the underside upwards.

Furthermore, this board floor makes possible the concealed laying of, for example, electric cables, water pipes and telephone cables. The tongue of the edge board left behind by the undercutting, can be more readily adapted to a given gap to be filled in the direction of the wall at the edge. Compared with the edge-splitting of conventional floor boards which results from sawing, the adaptation can now be performed readily with knives and, if desired, with planes which represent a significant improvement.

I claim:

1. A floor board adapted for fitting between a wall and a main portion of a board floor, said board being formed at its one side with a longitudinal groove for interconnectingly receiving a projecting part of said main floor portion and at its opposite side with an undercut for running alongside said wall while extending laterally inwards over a substantial portion of the breadth of said board.

2. The floor board of claim 1, wherein partition means are adapted for installation in said undercut to divide the latter into longitudinal ducts.

3. Board floor comprising a main floor portion with a surface made up of rectangular boards and joint strip means of corresponding vertical thickness, said boards being bounded by peripheral grooves and mounted in parallel and said joint strip means being substantially narrower than said boards and having tongues extending laterally outwards from and along opposite longitudinal sides thereof to engage said grooves of said boards, support beam means underlying said main floor portion, said joint strip means further comprising a detachable component disposed between its opposite longitudinal sides and extending through and beyond said vertical thickness into an anchoring relation with said support beam means, and a rectangular edge-forming board for fitting between a wall and parallel to a board of the main floor portion is supported by said support beam means and is formed at its one longitudinal side with a longitudinal groove engaged by the tongue on one longitudinal side of adjacent joint strip means while the tongue on the opposite longitudinal side of the latter engages a longitudinal groove of said parallel board, and said edge-forming board has a vertical thickness corresponding to that of said adjacent joint strip means and defines at its opposite longitudinal side an undercut running longitudinally alongside said wall and extending laterally inwards over a substantial portion of the breadth of said edge-forming board.

4. Board floor comprising a main floor portion with a surface made up of rectangular boards and joint strip means of corresponding vertical thickness, said board being bounded by peripheral grooves and mounted in parallel and said joint means being substantially narrower than said boards and having tongues extending laterally outwards from and along opposite longitudinal sides thereof to engage said grooves of said boards, support beam means underlying said main floor portion, said joint strip means further comprising a detachable component disposed between its opposite longitudinal sides and extending through and beyond sdaid vertical thickness into an anchoring relation with said support beam means, and a rectangular edge-forming board for fitting between a wall and parallel to a board of the main floor portion is supported by said support beam means and is formed at its one longitudinal side with a longitudinal groove engaged by the tongue on one longitudinal side of adjacent joint strip means while the tongue on the opposite longitudinal side of the latter engages a longitudinal groove of said parallel board, and said edge-forming board has a vertical thickness corresponding to that of said adjacent joint strip means and defines at its opposite longitudinal side an undercut running longitudinally alongside said wall and extending laterally inwards over a substantial portion of the breadth of said edge-forming board, and wherein said edge-forming board has at each end a transverse undercut similar to and forming a continuation of said longitudinal undercut substantially at right angles thereto.

5. Board floor comprising a main floor portion with a surface made up of rectangular boards and joint strip means of corresponding vertical thickness, said boards being bounded by peripheral grooves and mounted in parallel and said joint strip means being substantially narrower than said boards and having tongues extending laterally outwards from and along opposite longitudinal sides thereof to engage said grooves of said boards, support beam means underlying said main floor portion, said joint strip means further comprising a detachable component disposed between its opposite longitudinal sides and extending through and beyond said vertical thickness into an anchoring relation with said support beam means, and a rectangular edge-forming board for fitting between a wall and parallel to a board of the main floor portion is supported by said support beam means and is formed at its one longitudinal side with a longitudinal groove engaged by the tongue on one longitudinal side of adjacent joint strip means while the tongue on the opposite longitudinal side of the latter engages a longitudinal groove of said parallel board, and said edge-forming board has a vertical thickness corresponding to that of said adjacent joint strip means and defines at its opposite longitudinal side an undercut running longitudinally alongside said wall and extending laterally inwards over a substantial portion of the breadth of said edge-forming board, and wherein said edge-forming has at each end a transverse undercut similar to and forming a continuation of said longitudinal undercut substantially at right angles thereto and another edge-forming board runs transversely of ends of said boards of said main floor portion with its longitudinal groove engaged by the tongue of adjacent joint strip means while the opposite tongue engages said ends of said boards, said adjacent joint strip means and said edge-forming board having corresponding vertical thicknesses and said edge-forming board having a longitudinal undercut similar to that of said first-mentioned edge-forming board and which forms a continuation of said transverse undercut of the latter.

6. Board floor comprising a main floor portion with a surface made up of rectangular boards and joint strip means of corresponding vertical thickness, said boards being bounded by peripheral grooves and mounted in parallel and said joint strip means being substantially narrower than said boards and having tongues extending laterally outwards from and along opposite longitudinal sides thereof to engage said grooves of said boards, support beam means underlying said main floor portion, said joint strip means further comprising a detachable component disposed between its opposite longitudinal sides and extending through and beyond said vertical thickness into an anchoring relation with said support beam means, and a rectangular edge-forming board for fitting between a wall and parallel to a board of the main floor portion is supported by said support beam means and is formed at its one longitudinal side with a longitudinal groove engaged by the tongue on one longitudinal side of adjacent joint strip means while the tongue on the opposite longitudinal side of the latter engages a longitudinal groove of said parallel board, and said edge-forming board has a vertical thickness corresponding to that of said adjacent joint strip means and defines at its opposite longitudinal side an undercut running longitudinally alongside said wall and extending laterally inwards over a substantial portion of the breadth of said edge-forming board, and wherein said edge-forming board has at each end a transverse undercut similar to and forming a continuation of said longitudinal undercut substantially at right angles thereto and another edge-forming board runs transversely of ends of said boards of said main floor portion with its longitudinal groove engaged by the tongue of adjacent joint strip means while the opposite tongue engages said ends of said boards, said adjacent joint strip means and said edge-forming board having corresponding vertical thicknesses and said edge-forming board having a longitudinal undercut similar to that of said first-mentioned edge-forming board and which forms a continuation of said transverse undercut of the latter, said undercuts being dimensioned to accommodate at least one of an electric cable and a water pipe.

7. Board floor comprising a main floor portion with a surface made up of rectangular boards and joint strip means of corresponding vertical thickness, said boards being bounded by peripheral grooves and mounted in parallel and said joint strip means being substantially narrower than said boards and having tongues extending latrally outwards from and along opposite longitudinal sides thereof to engage said grooves of said boards, support beam means underlying said main floor portion, said joint strip means further comprising a detachable component disposed between its opposite longitudinal sides and extending through and beyond said vertical thickness into an anchoring relation with said support beam means, and a rectangular edge-forming board for fitting between a wall and parallel to a board of the main floor portion is supported by said support beam means and is formed at its one longitudinal side with a longitudinal groove engaged by the tongue on one longitudinal side of adjacent joint strip means while the tongue on the opposite longitudinal side of the latter engages a longitudinal groove of said parallel board, and said edge-forming board has a vertical thickness corresponding to that of said adjacent joint strip means and defines at its opposite longitudinal side an undercut running longitudinally alongside said wall and extending laterally inwards over a substantial portion of the breadth of said edge-forming board, and wherein said edge-forming board has at each end a transverse undercut similar to and forming a continuation of said longitudinal undercut substantially at right angles thereto and another edge-forming board runs transversely of ends of said boards of said main floor portion with its longitudinal groove engaged by the tongue of adjacent joint strip means while the opposite tongue engages said ends of said boards, said adjacent joint strip means and said edge-forming board having corresponding vertical thicknesses and said edge-forming board having a longitudinal undercut similar to that of said first-mentioned edge-forming board and which forms a continuation of said transverse undercut of the latter, said undercuts being dimensioned to accommodate at least one of an electric cable and a water pipe and wherein partition means installed in each undercut between said board and said support beam means divides said undercut into longitudinal ducts.

8. Board floor comprising a main floor portion with a surface made up of rectangular boards and joint strip means of corresponding vertical thickness, said boards being bounded by peripheral grooves and mounted in parallel and said joint strip means being substantially narrower than said boards and having tongues extending laterally outwards from and along opposite longitudinal sides thereof to engage said grooves of said boards, support beam means underlying said main floor portion, said joint strip means further comprising a detachable component disposed between its opposite longitudinal sides and extending through and beyond said vertical thickness into an anchoring relation with said support beam means, and a rectangular edge-forming board for fitting between a wall and parallel to a board of the main floor portion is supported by said support beam means and is formed at its one longitudinal side with a longitudinal groove engaged by the tongue on one longitudinal side of adjacent joint strip means while the tongue on the opposite longitudinal side of the latter engages a longitudinal groove of said parallel board, and said edge-forming board has a vertical thickness corresponding to that of said adjacent joint strip means and defines at its opposite longitudinal side an undercut running longitudinally alongside said wall and extending laterally inwards over a substantial portion of the breadth of said edge-forming board and wherein a support strip is accommodated in said longitudinal undercut at a position adjacent said wall.

* * * * *